H. L. HAVEN.
COLLAPSIBLE ARBOR.
APPLICATION FILED JULY 20, 1921.
1,427,155.
Patented Aug. 29, 1922.
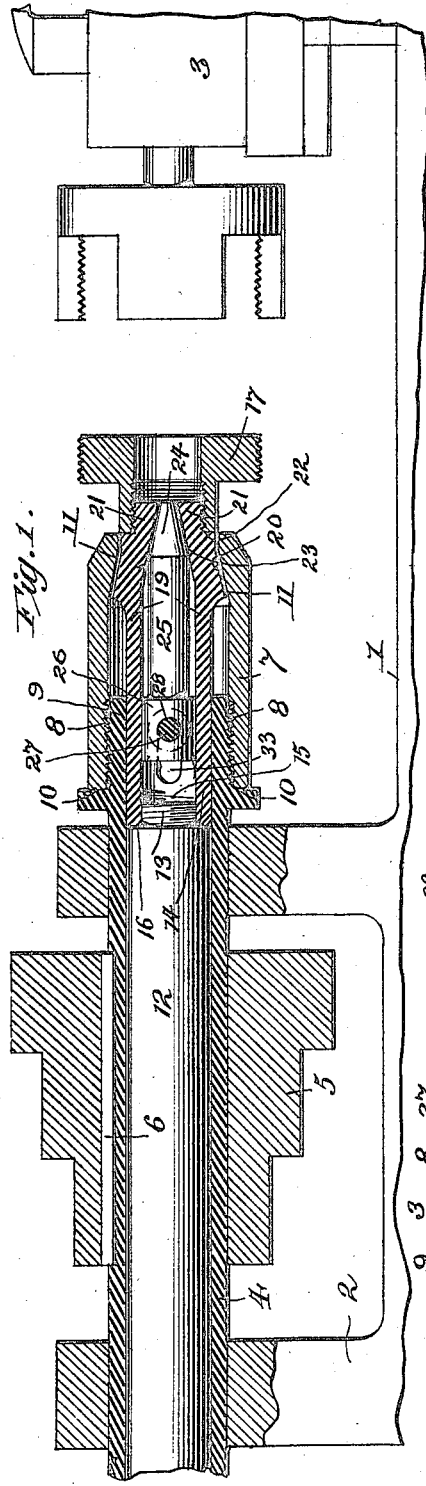
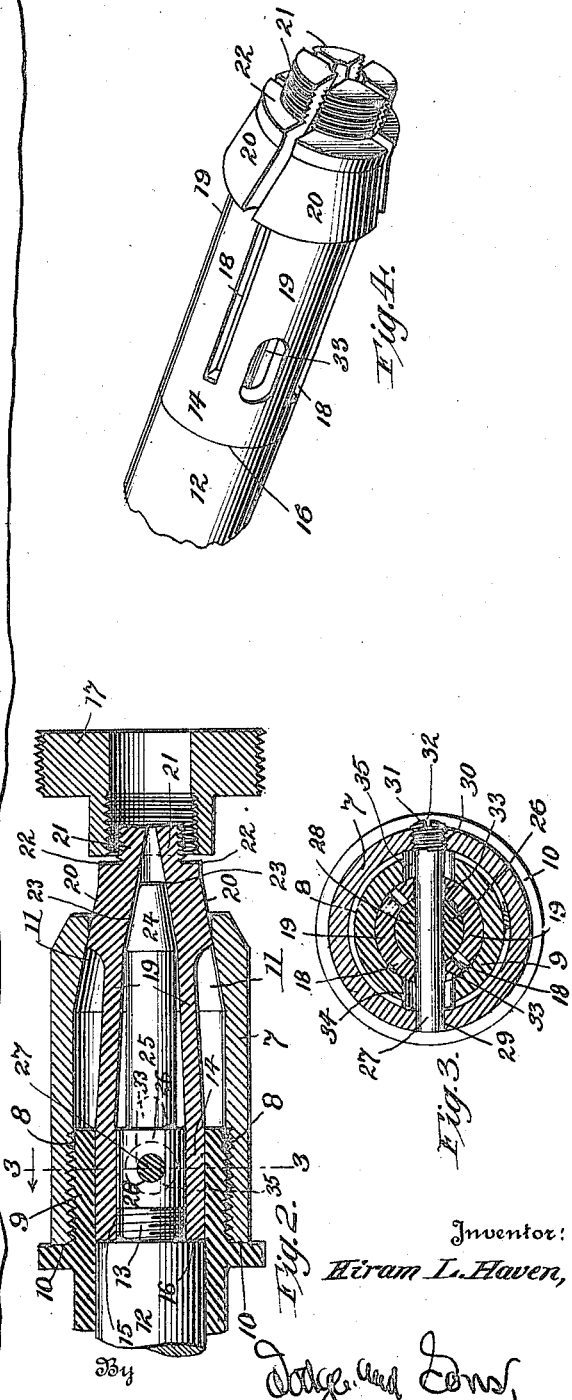
Inventor:
Hiram L. Haven,
By
Attorneys.

ly between them and the inner ends of the
UNITED STATES PATENT OFFICE.

HIRAM L. HAVEN, OF LEXINGTON, MASSACHUSETTS.

COLLAPSIBLE ARBOR.

1,427,155.

Specification of Letters Patent.   Patented Aug. 29, 1922.

Application filed July 20, 1921. Serial No. 486,143.

*To all whom it may concern:*

Be it known that I, HIRAM L. HAVEN, a citizen of the United States, residing at Lexington, in the county of Middlesex and State of Massachusetts, have invented certain new and useful Improvements in Collapsible Arbors, of which the following is a specification.

The present invention relates to arbors or mandrels for lathes, and more particularly consists of a collapsible threaded arbor designed to operate so that internally threaded work, such for instance, as pipe unions, etc., to be held on the arbor for further operations, may be removed from and applied to the arbor without the necessity of screwing the piece of work on or off the arbor or stopping the lathe.

It is the purpose of the present device to gain machine time in performing the numerous steps involved in the finishing of pipe unions, etc., and its use in fact is intended to eliminate several of the steps heretofore necessary in performing operations of labor on pieces of work previously internally threaded.

In general, the device, which is adapted to be attached to the live spindle of a lathe, comprises an expansible and contractible work-holding member having associated therewith inner and outer camming members adapted to collapse or expand the work-holding member when the latter is moved along its longitudinal axis through suitable means controlled by the operator, so as to allow ready removal or application of the piece of work as desired.

In the accompanying drawing, wherein like figures indicate the same parts throughout the several views, there is shown a practical embodiment of the invention.

Figure 1 is a longitudinal sectional view showing the device applied to a lathe. A piece of work is shown supported by the arbor, and the parts of the arbor are accordingly in work-engaging position;

Figure 2, a similar fragmentary, sectional view, with the parts in work-disengaging position and the work removed;

Fig. 3, a section on line 3—3 of Fig. 2; and

Fig. 4, a perspective of the work-holding member and its operating rod, the other parts having been removed.

In the drawing, Fig. 1, the device is shown applied to an ordinary type of lathe. The body of the lathe is represented at 1, the head stock at 2, and the tail stock at 3. The live spindle of the lathe is shown at 4, the same being provided with the usual pulleys 5 secured thereon by means of a key 6. The pulleys 5 are driven by means of the usual belt (not shown) connected to a suitable source of power.

The arbor proper comprises an outer sleeve 7 interiorly threaded for a suitable distance, as shown at 8, whereby it may be screwed on to the outer exteriorly threaded end 9 of the spindle 4 of the lathe until it abuts against the usual shoulder 10 provided thereon. At its forward end the outer sleeve 7 is provided with an interior tapered portion 11, the purpose of which will appear later. Passing through the hollow live spindle 4 of the lathe is an operating-rod 12 having a threaded reduced portion 13 at its outer extremity. On this reduced end 13 of rod 12 is mounted the work-holding member 14, which is interiorly threaded at 15 for this purpose, member 14 being screwed up tightly against shoulder 16 and the operating-rod and work-holding member thereby firmly secured together.

As member 14 is the part of the device which receives the interiorly threaded piece of work 17 at its outer end, it is necessary that this end be made expansible and contractible, and for this purpose it is provided with a series of longitudinal slots 18 extending from near its inner end to its outer end, whereby a plurality of spring arms 19 are formed. Each of the arms 19 is provided near its outer extremity with an exterior beveled portion 20, adapted, upon forward longitudinal movement of operating-rod 12, to coact with beveled portion 11 of the outer sleeve 7 to contact or collapse the outer end of member 14, as will be explained later. Spring arms 19 are also each provided at their outer extremities with exteriorly threaded, reduced portions 21 adapted to be expanded within and engage the interiorly threaded portion of the piece of work 17.

Each arm 19 is provided with a shoulder 22 adjacent its threaded portion 21. These shoulders are important, in that they provide a face for the work to bear against when tools are applied under cut to the work, as when severe cuts are taken the work is very apt to change its position on the threaded end of work-holding member 14.

Interiorly each of the spring arms 19 is provided with a beveled face 23 adapted to engage the beveled extremity 24 of a stationary plug 25, located within member 14, to expand the outer end of the latter when operating-rod 12 is moved rearwardly. Plug 25 is also provided with an enlarged rear portion 26 whereby to locate it centrally within member 14.

In order to hold plug 25 stationary with reference to casing 7, there is provided a cross-pin 27 which passes through an opening 28 in the enlarged portion 26 of the plug and through openings 29 and 30 in casing 7. Opening 30 in member 7 is screw-threaded in order to receive the enlarged threaded portion 31 on the end of pin 27, whereby the pin is secured in place. A slot 32 is provided in the end of pin 27 so that the pin may be screwed into place.

Diametrically opposite each other in the spring arms 19 of member 14 there is provided a pair of longitudinally-extending slots 33 through which cross-pin 27 passes. These slots are made sufficiently long to permit the advancement and retraction of member 14 by means of rod 12 without interference from pin 27. Inasmuch as the means for advancing and retracting the work-holding member 14 form no part of the present invention, none have been shown in the drawings. Various means, however, will suggest themselves to those skilled in the art. The device may be operated by hand with a lever at the side of the lathe for controlling backward and forward movement of the operating-rod 12, but to be used to the greatest advantage, an air cylinder should be installed on the back end of the spindle of the lathe for securing the reciprocating movement of the operating-rod.

In fitting the arbor to a lathe it is necessary that the threaded portion 9 of the spindle 4 be provided with two diametrically opposite holes 34, 35, for the passage of cross-pin 27. In practice it has been found advisable to make holes 34, 35, larger than pin 27 so that, even though the threads on member 7 or the spindle 4 develop wear or do not make up exactly each time in assembling and re-assembling the arbor, pin 27 will readily pass through openings 34, 35.

In assembling the device, plug 25 is placed in work-holding member 14 and the latter then screwed on to the threaded end of operating-rod 12. These assembled parts are then placed within the hollow spindle 4 and outer member 7 screwed into place on the threaded end 9 of the spindle. The holes in the several parts of the arbor for the passage of cross-pin 27 are brought into registry and the pin passed through them and screwed into place.

The device having been mounted on a lathe in the manner above described, operating-rod 12 and work-holding member 14 are brought to their advanced or forward position as shown in Fig. 2. As member 7 is stationary, during this forward movement of member 14 the external inclined faces 20 on the arms of member 14 will ride on the inner inclined face 11 of casing 7, thereby contracting the outer screw-threaded end of member 14 to receive the piece of work. It is intended that the threaded end of member 14 shall be contracted sufficiently to permit the placing of an internally-threaded piece of work thereon, or to permit its removal, without the necessity of screwing or unscrewing the piece of work. Member 14 having been collapsed, the work 17 is placed thereon and pressed slightly against the shoulders 22 to hold the work in place until member 14 is expanded. In order to grip the work tightly, operating-rod 12, together with member 14, is retracted, whereby the inclined faces 20 on the spring arms of member 14 are disengaged from the inner inclined face 11 of member 7, allowing spring arms 19 to return to their normal position. Further movement of rod 12 and member 14, however, brings the inner inclined faces 23 of member 14 into engagement with the tapered end 24 of plug 25, thereby expanding the threaded portions 21 of arms 19 within the work 17 and into firm engagement with the threads in the work.

While the practical embodiment of the invention has been shown and described, it will be understood that numerous changes may be made in the construction without departing from the scope of the invention, as defined by the appended claims.

I claim as my invention:

1. An arbor comprising in combination, a casing adapted to be mounted on the live spindle of a lathe; a one-piece work-holding member located within said casing and having a threaded contractible and expansible work-receiving portion projecting beyond the outer end of said casing; a plug mounted within said work-holding member and secured against longitudinal movement with reference to said casing; and means for moving said work-holding member longitudinally in either direction within the casing, said casing, said work-holding member and said plug each being provided with co-acting cam faces which serve to contract the work-receiving portion of the work-holding member upon movement of said member in one direction, and to expand said portion upon movement of said member in the opposite direction.

2. A device of the character described, comprising in combination, a hollow casing adapted to be attached to the live spindle of a lathe, said casing having an interior inclined portion; a hollow work-holding member located within said casing, said member being formed at its outer end with a plurality of longitudinally-extending spring arms each provided with an exterior inclined portion adapted, upon forward axial movement of the work-holding member, to engage with said inclined portion of the casing to contract the outer end of the work-holding member, said spring arms also each being provided with a threaded work-receiving portion at its outer end projecting beyond the casing, and an interior inclined portion; a plug located within said work-holding member and having a tapered forward end adapted, upon rearward axial movement of the work-holding member, to engage with said interior inclined portions of the spring arms to expand the outer end of the work-holding member; means for securing the outer casing and the plug against relative longitudinal movement; and means for moving the work-holding member longitudinally in either direction within said casing.

3. In a device of the character described, the combination of a hollow work-holding member having a plurality of longitudinally-extending spring arms at its outer end, the opposite end thereof being adapted to be located within the live spindle of a lathe; a plug mounted within said work-holding member; an outer casing surrounding said work-holding member and adapted to be mounted on the end of the lathe spindle; means for securing said plug and said casing against relative longitudinal movement; and means for moving the work-holding member longitudinally within said casing, the spring arms on the work-holding member, the plug and the outer casing being provided with coacting inclined portions adapted to engage each other to move said spring arms radially upon longitudinal movement of the work-holding member in either direction.

4. In a device of the character described, the combination of, a casing adapted to be mounted on the threaded end of the live spindle of a lathe, said casing being provided with an interior inclined portion; a hollow work-holding member mounted within said casing, said member having an interior inclined portion and an expansible and contractible work-receiving outer end provided with a threaded reduced portion, an exterior inclined portion and a plurality of slots extending back a substantial distance from said end; a plug having a tapered outer end and mounted in said work-holding member; means for securing the casing and the plug against relative longitudinal movement; and a rod attached to the inner end of the work-holding member and adapted to be located within the lathe spindle for moving the work-holding member longitudinally in either direction to bring said inclined portions and the tapered end of said plug into engagement to expand or contract the outer end of said work-holding member.

5. A device of the character described, comprising in combination, a hollow casing adapted to be attached to the live spindle of a lathe, said casing having an interior inclined portion; a hollow work-holding member located within said casing, said member being provided at its rear end with a pair of diametrically-opposed slots and formed at its outer end with a plurality of longitudinally-extending spring arms each provided with an exterior inclined portion adapted, upon forward axial movement of the work-holding member, to engage with said inclined portion of the casing to contract the outer end of the work-holding member, said spring arms also each being provided with a threaded work-receiving portion at its outer end projecting beyond the casing and an interior inclined portion; a plug located within said work-holding member and having an enlarged perforated rear portion serving to centralize the plug within said member, said plug also having a tapered forward end adapted, upon rearward axial movement of the work-holding member, to engage with said interior inclined portions of the spring arms to expand the outer end of the work-holding member; a cross-pin passing through the perforation in said plug and the slots in said work-holding member and secured at its ends in said casing to prevent relative longitudinal movement between said plug and said casing; and a rod attached to the rear end of the work-holding member and adapted to be located within the hollow spindle of the lathe for moving said work-holding member longitudinally in either direction within said casing.

In testimony whereof I have signed my name to this specification.

HIRAM L. HAVEN.